N. W. MORAN.
ARTIFICIAL FISH BAIT.
APPLICATION FILED DEC. 26, 1908.
934,087.
Patented Sept. 14, 1909.
2 SHEETS—SHEET 1.
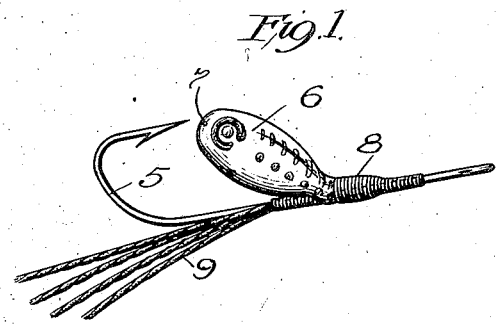
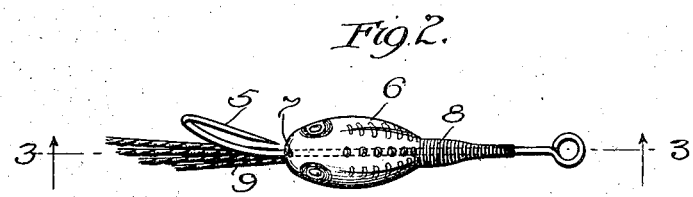
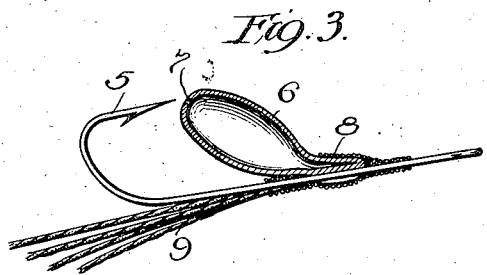

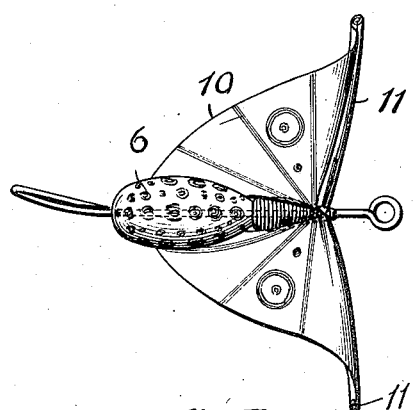
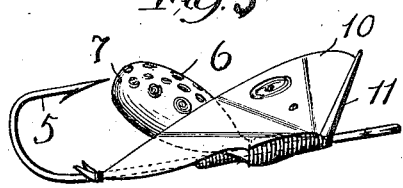
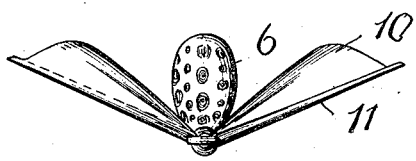

UNITED STATES PATENT OFFICE.

NED W. MORAN, OF CHICAGO, ILLINOIS.

ARTIFICIAL FISH-BAIT.

934,087.  Specification of Letters Patent.  Patented Sept. 14, 1909.

Application filed December 26, 1908. Serial No. 469,356.

*To all whom it may concern:*

Be it known that I, NED W. MORAN, a citizen of the United States, residing at Chicago, in the county of Cook and State of Illinois, have invented certain new and useful Improvements in Artificial Fish-Bait, of which the following is a specification.

My invention relates to improvements in artificial fish bait, and has among its objects to provide a novel, attractive, cheap, and efficient artificial bait of "weedless" construction, wherein the weedless guard constitutes the whole or a part of the lure, and is preferably of variable buoyancy. To these ends I provide a construction as illustrated in the drawing, wherein;

Figures 1, 2 and 3 are respectively side elevation, plan and sectional views, showing a simple bait embodying part of my invention, and; Figs. 4, 5 and 6 are plan, side elevation and end views of a more elaborate bait, embodying my invention.

In either construction I provide a fish hook 5 of any desired construction and particular configuration, and mount upon the shank of the hook a part which constitutes the whole or a part of the lure, a "weedless" guard for the hook point, and a variable-buoyancy float, to permit the hook to be either floated or submerged. Such part, which I will generally term the bulb, indicated at 6 in the drawing, is a hollow, flexible, impervious bulb, preferably stiff enough to be self-sustaining, but readily yielding under pressure, fixed upon the shank above the level of the point of the hook, in such manner as to extend downwardly and outwardly into close proximity to the point of the hook, as shown. The bulb is preferably of moderately soft rubber exteriorly decorated to any fanciful degree that may be desired to represent a grub, or otherwise, and hollow throughout, and at its lower free end preferably provided with an aperture 7, and at its upper end bound firmly upon the shank of the hook and completely closed, as by the wrapping 8. Any additional ornamentation, such as the yarn tail 9, or the like, and spinners, additional hooks or other desired auxiliaries may be employed at pleasure.

For a more expensive and elaborate bait I preferably provide as part of the lure, flexible water-proof wings which coact with the bulb in forming the representation of a flying bug. Each of the wings, 10, shown in Figs. 4 to 6 is preferably made of rubber of soft pliant quality, fashioned into generally triangular wings maintained spread and properly elevated by a strengthening rib 11, along its upper edge disposed substantially at right angles to the hook-shank. The rib 11 may be molded, or, as shown, it may be formed by rolling and cementing the rubber. The wings are preferably tied to the shank at both ends, and while of course the configuration may be varied I prefer that the outer edge of the wing shall be somewhat baggy or loose, so that when drawn through the water it may tend to vibrate somewhat and so simulate living motion.

It will be observed that the bulb 6 acts as an excellent "weedless" guard, and additionally serves to maintain the hook upright by reason of its flotative powers. When a fish bites at the bulb 6, however, the bulb depresses and enables the hook to perform its function. The bulb may be made of a size capable of floating the hook at the water line, and then obviously, by drawing water into the bulb by compressing the sides and permitting them to expand while the aperture 7 is under water, the air body within the bulb may be varied and its flotative powers accordingly decreased. The air hole 7 may, however, be so small that under normal conditions the bulb will not take in any water. The wings, when added, serve to make the bait active and lifelike in movement.

It will be obvious that details of the constructions shown may be varied without departure from its spirit, and it will be understood that the particular forms of my invention shown in the drawings are illustrated only for purposes of full disclosure.

Having described my invention what I claim is:

1. An artificial bait comprising a fish hook, and a hollow bulb of resilient material secured directly and only to the shank of the hook and extending downward and outward into proximity to the point of the hook and lying wholly above the level of said point.

2. An artificial bait comprising a fish hook and a hollow resilient bulb secured directly and only to the shank of the hook at a level above the point, extending outward and downward at an angle to said shank.

3. An artificial bait comprising a fish hook and a hollow, pear-shaped resilient bulb, its smaller end directly secured to the shank of the hook, its larger end being free and normally retained above the point of the hook.

4. An artificial bait, comprising a fish hook, and a yielding, hollow pear-shaped guard having its smaller end directly lashed to the shank of the hook and its larger end free and positioned wholly above the point of the hook to float said point in an upward position to protect same from contact with other objects and to bodily yield when pressure is applied to it.

5. In an artificial bait, a fish hook and a hollow compressible rubber bulb secured directly and only to the shank of the hook, its free end extending downward and outward to a point wholly in front of the hook and provided with a small aperture by which a predetermined quantity of water may be maintained to vary the buoyancy of the bulb.

6. In an artificial bait, a hook, a bulb extending from the shank toward the point, and wings extending laterally from the hook near the upper end of the bulb.

7. In an artificial bait, a hook, a hollow rubber bulb extending from the shank toward the point, and wings extending outward from the shank near the bulb, said wings being ribbed along their upper edges, to be self-sustaining but yielding.

8. In an artificial bait, a hook, and a yielding, compressible guard secured directly and only at one end to the shank, its free end extending therefrom toward, outwardly beyond and wholly in front of the point of the hook, and capable of being bodily and laterally displaced.

In testimony whereof I hereunto set my hand in the presence of two witnesses.

NED W. MORAN.

In the presence of—
FORÉE BAIN,
MARY F. ALLEN.